United States Patent
Iida

(10) Patent No.: US 6,552,971 B2
(45) Date of Patent: Apr. 22, 2003

(54) DISK DRIVE APPARATUS FOR A RECORDING MEDIUM HAVING PLURAL RECORDING SURFACES IN A LAYERED STRUCTURE

(75) Inventor: Michihiko Iida, Kanagawa (JP)

(73) Assignee: Sony Corporation, Tokyo (JP)

(*) Notice: Subject to any disclaimer, the term of this patent is extended or adjusted under 35 U.S.C. 154(b) by 129 days.

(21) Appl. No.: 09/477,209

(22) Filed: Jan. 4, 2000

(65) Prior Publication Data

US 2002/0093890 A1 Jul. 18, 2002

(30) Foreign Application Priority Data

Jan. 8, 1999 (JP) .............................. 11-003453

(51) Int. Cl.[7] .............................. G11B 7/095
(52) U.S. Cl. .................. 369/44.29; 369/53.14; 369/53.28
(58) Field of Search ............ 369/44.27, 44.29, 369/53.28, 53.29, 53.14

(56) References Cited

U.S. PATENT DOCUMENTS

| 5,740,136 A | * | 4/1998 | Tsutsui et al. ............ 369/44.25 |
| 5,745,461 A | * | 4/1998 | Kawasaki ..................... 369/58 |
| 5,748,597 A | * | 5/1998 | Kim ............................. 369/94 |
| 5,844,866 A | * | 12/1998 | Fujimoto et al. .............. 369/50 |
| 5,844,883 A | * | 12/1998 | Kanno et al. ............. 369/275.4 |
| 6,151,280 A | * | 11/2000 | Naohara et al. ......... 369/44.27 |
| 6,246,646 B1 | * | 6/2001 | Abe et al. ................. 369/44.27 |
| 6,370,093 B1 | * | 4/2002 | Tada et al. ................ 369/44.25 |

* cited by examiner

Primary Examiner—W. R. Young
Assistant Examiner—Gautam R. Patel
(74) Attorney, Agent, or Firm—Oblon, Spivak, McClelland, Maier & Neustadt, P.C.

(57) ABSTRACT

In order to perform stable focusing jump in accordance with the wobble of a disk, an optical pickup is moved radially inward toward a central area of the disk where the amount of wobble is small. A focusing error signal in accordance with wobble is feed-forwarded during focusing jump so as to also follow the wobble during the focusing jump. Furthermore, the position of an objective lens is maintained while waiting for the signal recording surface of the disk to reach a focus position due to wobble. In addition, the rotation speed of the disk is controlled in accordance with the amount of wobble.

11 Claims, 12 Drawing Sheets

DISK DRIVE APPARATUS FOR A RECORDING MEDIUM HAVING PLURAL RECORDING SURFACES IN A LAYERED STRUCTURE

BACKGROUND OF THE INVENTION

1. Field of the Invention

The present invention relates to a disk drive apparatus for writing and reading data by emitting laser light onto a signal recording surface of a recording medium having a plurality of signal recording surfaces which form a layered structure.

2. Description of the Related Art

As optical disk recording media, CD-type disks, such as those commonly called "CD-ROMs", and disks called "DVDs" (Digital Versatile Discs/Digital Video Discs) suitable for multimedia applications have been developed.

In disk drive apparatuses which use these optical disks, data is read by emitting laser light onto tracks on a disk rotated by a spindle motor from an optical pickup and by detecting the reflected light therefrom, or data is written by emitting laser light modulated by writing data onto tracks of a disk.

In order to perform a writing or reading operation by using laser light, the spot of the laser light must be maintained focused on a recording surface of the disk. For this purpose, in the disk drive apparatus, a focusing servo mechanism is provided for controlling the focus by moving an objective lens, which is at the output end of the laser light, toward or away from the disk. This focusing servo mechanism is conventionally formed of a two-axis mechanism having a focusing coil to move the objective lens toward and away from the disk and a tracking coil capable of moving the objective lens in the radial direction of the disk, and formed of focusing servo circuitry for generating a focusing error signal (i.e., a signal indicating the amount of difference from the focused state) from the information in the light reflected from the disk, generating a focusing driving signal in accordance with the focusing error signal, and applying the focus driving signal to the focusing coil of the two-axis mechanism. That is, the focusing servo mechanism is formed as a feedback control system.

Also, as is already well known, the range over which the spot of the laser light is brought into a focused state in accordance with the focusing error signal is in a very narrow range in which an S-shaped curve is observed as a focusing error signal. Consequently, in order to satisfactorily perform focusing servo, generally, an operation called "focusing search" is required as an operation for turning on a focusing servo loop.

In this focusing search operation, a focusing driving signal is applied to a focusing coil so that the objective lens is forced to move within the focusing stroke range thereof. At this time, while the focusing error signal is being detected, when the position of the objective lens is within a particular range, an S-shaped curve is observed. The focusing servo is turned on at the timing (or at the zero-crossing timing) at which the S-shaped curve is linear.

Some types of disks have a plurality of recording surfaces which form a layered structure. For example, in the case of the above-mentioned DVD, two signal recording surfaces, which are generally called "layer 0" and "layer 1", are formed.

The structure of a DVD having two signal recording surfaces is shown in FIG. 14. The DVD is a disk having a diameter of 12 cm, and the thickness of the disk is 1.2 mm, as shown in FIG. 14.

In the layered structure of this DVD, first, a disk substrate (transparent layer) 101 of a synthetic resin material, such as a transparent polycarbonate resin, a polychlorinated vinyl resin, or an acrylic resin, having a high light transmittance and mechanical resistance characteristics or chemical resistance characteristics, is formed on a disk surface 108.

Pits are transferred to the disk substrate 101 by a stamper having a molding die incorporated on one of its main surfaces, forming a first signal recording surface 102. The pits on this first signal recording surface 102 are formed, as small coded holes whose circumferential lengths differ from each other in accordance with a predetermined information signal, on the disk substrate 101, forming recording tracks.

Furthermore, a second signal recording surface 104 and a second reflection layer 105 corresponding to the second signal recording surface 104 are formed via a first reflection layer 103 corresponding to the first signal recording surface 102. The second signal recording surface 104 is also formed with pits corresponding to an information signal in a manner similar to that for the first signal recording surface 102.

A bonding surface 106 is formed on the second reflection layer 105, and a dummy plate 107 is bonded via the bonding surface 106.

Laser light from the disk drive apparatus is made to enter the DVD from the disk surface 108, and information recorded on the first signal recording surface 102 or the second signal recording surface 104 is detected from the reflected light therefrom.

More specifically, the first reflection layer 103 is formed into a semi-transparent film so that a fixed ratio of laser light is reflected. As a result, if the laser light is focused onto the first signal recording surface 102, it is possible to read a signal recorded on the first signal recording surface 102 from the light reflected by the first reflection layer 103. Also, when the laser light is focused on the second signal recording surface 104, the laser light passes through the first reflection layer 103 and is focused on the second signal recording surface 104, making it possible to read a signal recorded on the second signal recording surface 104 from the light reflected by the second reflection layer 105.

For a disk having a plurality of signal recording surfaces, such as a DVD with a two-layered structure, it is necessary for the focusing servo mechanism to focus the laser light onto the respective signal recording surfaces. In other words, when the laser light is focused on one of the signal recording surfaces, it is necessary that an operation for changing the focus onto the other signal recording surface, that is, a focusing jump operation, can be performed.

This focusing jump operation is performed by forcing the objective lens to move while the focusing servo is turned off when a focused state is reached on one of the signal recording surfaces and by turning on the focusing servo when the laser light reaches in a focusing pull-in range for the other signal recording surface (i.e., when the S-shaped curve is observed). That is, this is an operation similar to that in the above-described focusing search operation.

When such a focusing jump is t o be performed, by considering a surface wobbling of the disk, influences of external disturbances are reduced by moving the objective lens at an acceleration larger than the wobbling acceleration thereof.

However, in a disk having a large degree of wobble, the focus position of the objective lens must be displaced greatly within the rotation cycle of the disk. Therefore, in order to perform a focusing jump operation with respect to a disk having a large degree of wobble, it is necessary that complex servo control be performed in which the rotation speed and the amount of wobble of the disk are taken into consideration.

SUMMARY OF THE INVENTION

In order to solve these problems, in one aspect, the present invention provides an apparatus for writing and reading data by emitting laser light on each signal recording surface of a recording medium having a plurality of signal recording surfaces, the apparatus comprising: a pickup device having an objective lens which is at an output end of the laser light; an objective lens moving device for setting the focused state of the laser light with respect to the signal recording surface of the recording medium by moving the objective lens toward or away from the recording medium; a detection device for detecting moved distance information indicating the relative distance moved between the objective lens and the signal recording surface; and a focusing jump control device for controlling the objective lens moving device so that a focusing jump operation is performed for moving the focus position of the objective lens from the current signal recording surface to another signal recording surface, wherein the focusing jump control device performs the focusing jump operation at a position where the relative distance moved with respect to the recording medium is not more than a predetermined value.

In another aspect, the present invention provides an apparatus for writing and reading data by emitting laser light on each signal recording surface of a recording medium having a plurality of signal recording surfaces, the apparatus comprising: a pickup device having an objective lens which is at an output end of the laser light; an objective lens moving device for setting the focused state of the laser light with respect to the signal recording surface of the recording medium by moving the objective lens toward or away from the recording medium; a detection device for detecting moved distance information indicating the relative distance moved between the objective lens and the signal recording surface; a focusing jump control device for controlling the objective lens moving device so that a focusing jump operation is performed for moving the focus position of the objective lens from the current signal recording surface to another signal recording surface; and a storage device for storing the moved distance information within a predetermined period, wherein the focusing jump control device controls the objective lens moving device in accordance with moved distance information stored in the storage device and a driving signal for a focusing jump operation.

In another aspect, the present invention provides apparatus for writing and reading data by emitting laser light on each signal recording surface of a recording medium having a plurality of signal recording surfaces, the apparatus comprising: a pickup device having an objective lens which is at an output end of the laser light; and an objective lens moving device for setting the focused state of the laser light with respect to the signal recording surface of the recording medium by moving the objective lens toward or away from the recording medium, wherein the objective lens moving device moves the focus position of the objective lens from the current signal recording surface to another signal recording surface by maintaining the current position of the objective lens while maintaining the level of a driving signal for moving the objective lens.

According to the present invention, when data is read from a disk with a plurality of signal recording surfaces in a layered structure, stable focusing jumps can be performed.

The above and further objects, aspects and novel features of the invention will become more apparent from the following detailed description when read in connection with the accompanying drawings.

DESCRIPTION OF THE PREFERRED EMBODIMENTS

The preferred embodiments of a disk drive apparatus using an optical disk as a recording medium according to the present invention will be described below.

Figure 14:
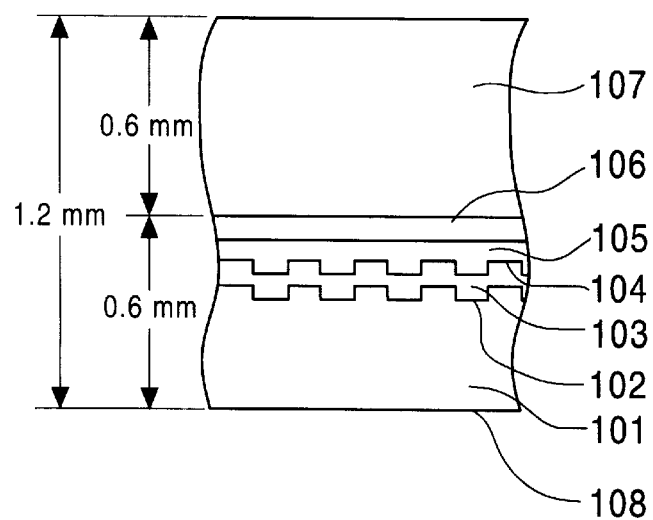
FIG. 14 is an illustration of a DVD layer structure.

An optical disk, such as a DVD, which is loaded into the disk drive apparatus of this example, is specifically a disk having signal recording surfaces in a two-layer structure, as shown in FIG. 14. The present invention can be applied to other types of optical disk, and its characterized operation (i.e., operation during focusing jump) is equally effective for disks with a layered structure having a plurality of signal recording surfaces.

Figure 1:
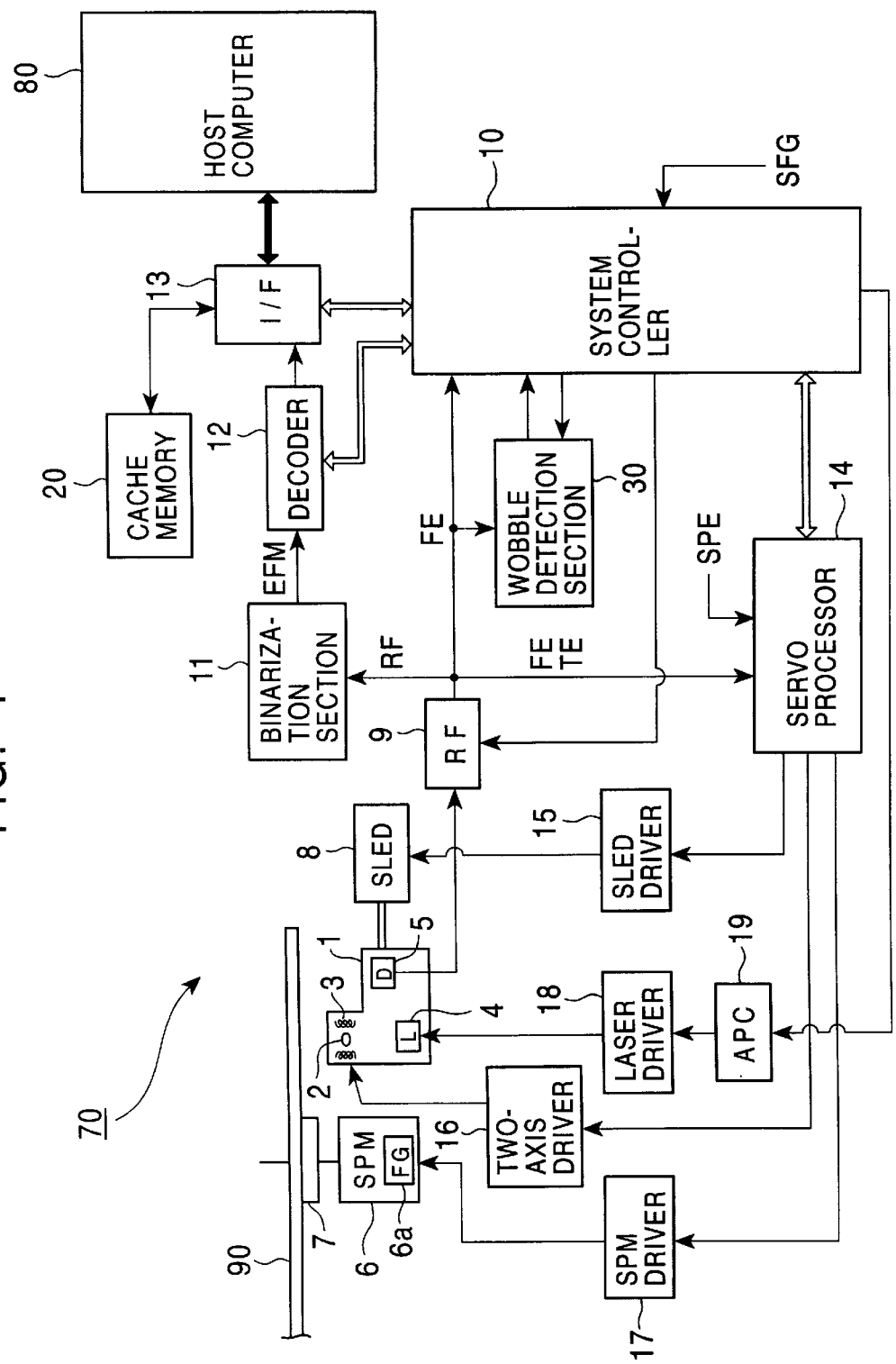
FIG. 1 is a block diagram of a disk drive apparatus according to an embodiment of the present invention.

FIG. 1 is a block diagram of an essential portion of a disk drive apparatus 70 in this example.

A disk 90, which is placed on a turntable 7, is drivingly rotated at a constant linear velocity (CLV) or at a constant angular velocity (CAV) by a spindle motor 6 during a reading operation. Then, reading of data written in the form of embossed pits or in the form of phase-change pits on the disk 90 is performed by a pickup 1.

In order to perform servo control of the spindle motor 6, the spindle motor 6 is provided with a spindle FG (frequency generator) 6a so that a frequency pulse SFG (hereinafter also referred to as an "FG pulse SFG") synchronized with the rotation of the spindle motor 6 can be generated. A system controller 10 is capable of detecting rotation information of the spindle motor 6 on the basis of the frequency pulse SFG from the spindle FG 6a.

Inside the pickup 1, a laser diode 4 which serves as a laser source, a photodetector 5 for detecting reflected light, an objective lens 2 which is at the output end of the laser light, and an optical system which emits laser light on a signal recording surface via the objective lens 2 and which guides the reflected light therefrom to the photodetector 5 are formed.

The objective lens 2 is held in such a manner as to be capable of moving in a tracking direction and in a focusing direction by a two-axis mechanism 3. Also, the entire pickup 1 is capable of moving in the direction of the disk radius by a sled mechanism 8.

The reflected light information from the disk 90 is detected by the photodetector 5, is formed into an electrical signal in accordance with the amount of received light, and is supplied to an RF amplifier 9.

The RF amplifier 9 comprises a current/voltage conversion circuit in accordance with output current from a plurality of photoreceiving elements as the photodetector 5, a matrix computation/amplification circuit, etc., and generates a signal required by a matrix computation process. For example, an RF signal which is readout data, a focusing error signal FE for servo control, a tracking error signal TE, etc., are generated.

The regenerated RF signal output from the RF amplifier 9 is supplied to a binarization circuit 11, and the focusing error signal FE and the tracking error signal TE are supplied to a servo processor 14.

The regenerated RF signal obtained by the RF amplifier 9 is binarized by the binarization circuit 11 so as to be what is commonly called an "EFM+signal" (8–16 modulation signal), and the EFM+signal is supplied to a decoder 12. The decoder 12 performs EFM+demodulation, an error-correction process, etc., and performs MPEG decoding as required in order to regenerate information read from the disk 90. The decoder 12 stores the decoded data in a cache memory 20 serving as a data buffer.

As a regenerated output from the disk drive apparatus 70, data which has been buffered in the cache memory 20 is read, and is transferred and output.

An interface section 13, which is connected to an external host computer 80, communicates readout data, a read command, etc., between it and the host computer 80.

More specifically, the readout data stored in the cache memory 20 is transferred and output to the host computer 80 via the interface section 13. Also, the read command, and other signals from the host computer 80 are supplied to the system controller 10 via the interface section 13.

The servo processor 14 generates various servo driving signals for focusing, tracking, the sled, and the spindle so that a servo operation is performed in accordance with the focusing error signal FE and the tracking error signal TE from the RF amplifier 9, and in accordance with a spindle error signal SPE from the decoder 12 or the system controller 10.

More specifically, a focusing driving signal and a tracking driving signal are generated in accordance with the focusing error signal FE and the tracking error signal TE, and are supplied to a two-axis driver 16. The two-axis driver 16 drives the focusing coil and the tracking coil of the two-axis mechanism 3 in the pickup 1. As a result, a tracking servo loop and a focusing servo loop by the pickup 1, the RF amplifier 9, the servo processor 14, the two-axis driver 16, and the two-axis mechanism 3 are formed.

A wobble detection section 30 detects wobble of the disk 90, for example, on the basis of the focusing error signal FE, as will be described later in detail.

To activate the focusing servo, a focusing search operation must first be performed. The focusing search operation is such that, while the objective lens 2 is forced to move in a state in which the focusing servo is turned off, the position at which the S-shaped curve of the focusing error signal FE can be obtained is detected. As is well known, the linear area in the S-shaped curve of the focusing error signal is a range in which the position of the objective lens 2 is brought into the focus position by closing the focusing servo loop. Therefore, while the objective lens 2 is forced to move in a focusing search operation, the above-mentioned pull-in range is detected, and the focusing servo is turned on at that timing. As a result, thereafter, a focusing servo operation by which the laser spot is maintained focused is realized.

Figure 2:
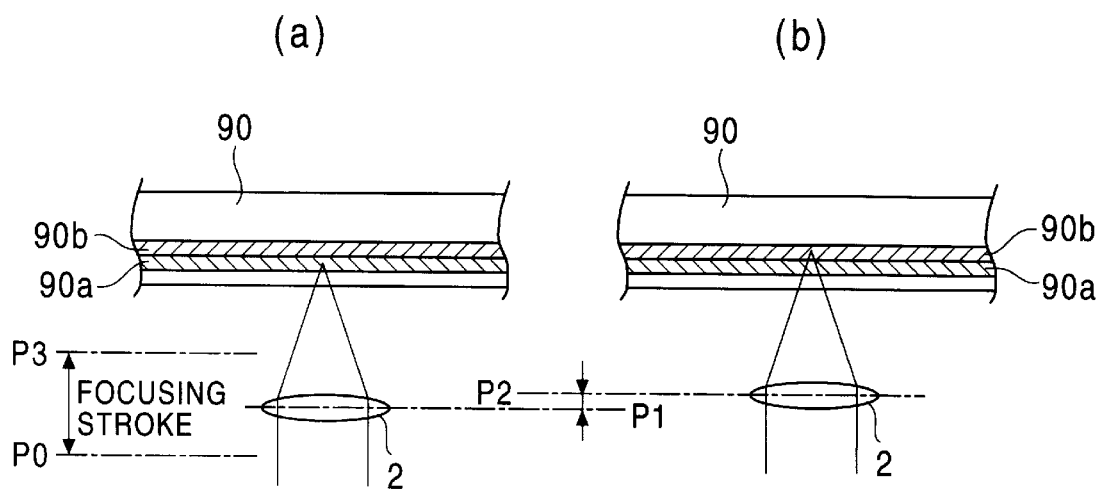
FIG. 2 is an illustration of a focusing jump operation according to the embodiment of the present invention.

In the case of this example, the signal recording surfaces of the disk 90 are formed into a two-layer structure, as shown as a first signal recording surface 90a and a second signal recording surface 90b in parts (a) and (b) of FIG. 2. That is, this is a structure shown in FIG. 14.

Of course, when writing and reading is performed on and from the first signal recording surface 90a, laser light must be focused on the first signal recording surface 90a. Also, when writing and reading is performed on and from the second signal recording surface 90b, laser light must be focused on the second signal recording surface 90b.

The focused state of the first signal recording surface 90a is shown in part (a) of FIG. 2, and the position of the objective lens 2 at this time is assumed to be a position P1. Also, the focused state of the first signal recording surface 90b is shown in part (b) of FIG. 2, and the position of the objective lens 2 at this time is assumed to be a position P2. Positions P0 to P3 are assumed to be a focusing stroke range in which the objective lens 2 can move toward or away from the disk 90.

For example, when shifting to a reading operation on the second signal recording surface 90b after the reading operation on the first signal recording surface 90a, the position of the objective lens 2 must be moved from position P1 to position P2. Of course, the reverse is possible. Such movement of the focusing position between the first signal recording surface 90a and the second signal recording surface 90b is performed by a focusing jump operation.

As described above, this focusing jump operation is performed by forcing the objective lens 2 to move by deactivating the focusing servo while focus is achieved on one of the signal recording surfaces and by activating the focusing servo when the objective lens 2 reaches a focusing pull-in range with respect to the other signal recording surface (at the time when the S-shaped curve is observed).

In this specification, regarding an operation for moving the focus position from one of the signal recording surfaces to the other signal recording surface, an operation which does not involve the movement of the objective lens 2 is also called a focusing jump operation.

Figure 3:
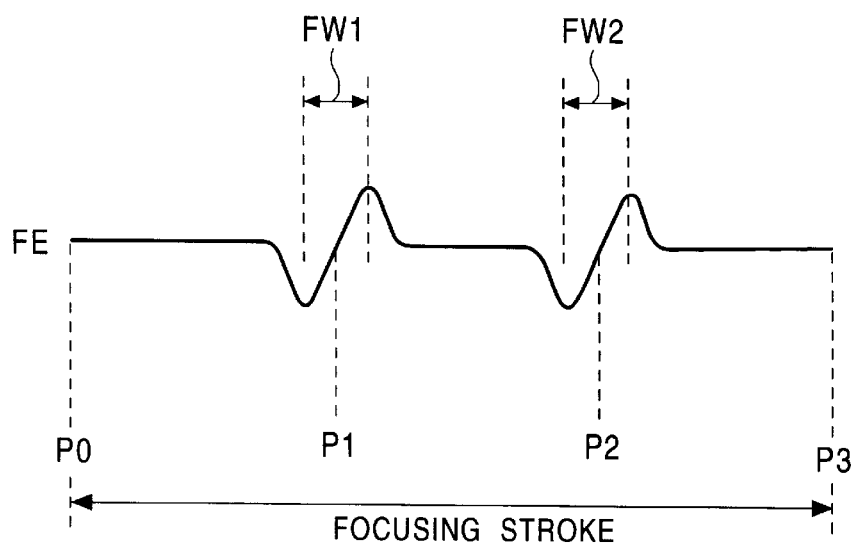
FIG. 3 is an illustration of an S-shaped curve of a focusing error signal according to the embodiment of the present invention.

FIG. 3 shows an example of a focusing error signal FE which is observed when the objective lens 2 is moved in a focusing stroke range from position P0 to position P3. As shown in FIG. 3, an S-shaped curve is observed with positions P1 and P2 being the center at which a focused state is reached for each of the first signal recording surface 90a and the second signal recording surface 90b. The position ranges of the linear area of each S-shaped curve become focusing pull-in ranges FW1 and FW2 with respect to each signal recording surface.

In FIG. 1, the servo processor 14 further supplies a spindle driving signal generated in accordance with the spindle error signal SPE to a spindle motor driver 17. The spindle motor driver 17 applies, for example, a three-phase driving signal to the spindle motor 6 in response to the spindle driving signal so that the CLV rotation of the spindle motor 6 is performed. Also, the servo processor 14 causes a spindle driving signal to be generated in response to a spindle kick/braking control signal from the system controller 10 so that an operation, such as starting, stopping, acceleration, and deceleration of the spindle motor 6 is performed by the spindle motor driver 17.

The linear speed of the CLV rotation of the spindle motor 6 can be set to various speeds by the system controller 10.

For example, the decoder 12 generates a regeneration clock synchronized with the EFM signal used for a decoding process, and the current rotation speed information can be obtained from this regeneration clock. The system controller 10 or the decoder 12 compares such current rotation speed information with reference speed information in order to generate a spindle error signal SPE for the CLV servo. Therefore, the system controller 10 can change the linear speed as the CLV rotation if the value as the reference speed information is switched. For example, a linear speed, such as 4× speed or 8× speed, can be realized with a particular normal linear speed being a reference. This makes a higher rate of data transfer possible. Of course, changing the rotation speed is also possible in the CAV method.

The servo processor 14 generates, for example, a sled error signal obtained as the low-frequency components of the tracking error signal TE, and a sled driving signal on the basis of access execution control from the system controller 10, and supplies them to a sled driver 15. The sled driver 15 drives the sled mechanism 8 in accordance with the sled driving signal. The sled mechanism 8 has a mechanism (not shown) comprising a main shaft for holding the pickup 1, a sled motor, a transmission gear, etc. When the sled driver 15 drives the sled mechanism 8 in accordance with the sled driving signal, a predetermined sliding movement of the pickup 1 is performed.

The laser diode 4 in the pickup 1 is driven to emit laser light by a laser driver 18.

When an operation for reading from the disk 90 is performed, the system controller 10 sets the control value of laser power to an automatic power control circuit 19. The automatic power control circuit 19 controls the laser driver 18 so that laser output is performed in accordance with the value of the set laser power.

In the case of an apparatus capable of performing a writing operation, a signal modulated in accordance with writing data is applied to the laser driver 18.

For example, when writing is performed on a recordable-type disk 90, the writing data supplied from the host computer to the interface section 13 is subjected to a process, such as addition of an error-correction code or EFM+modulation, by an encoder (not shown), after which the data is supplied to the laser driver 18. Then, the laser driver 18 causes the laser diode 4 to perform a laser-light emitting operation in accordance with writing data so that data is written on the disk 90.

Various operations as described above, such as servo, decoding and encoding, are controlled by the system controller 10 formed by a microcomputer.

Then, the system controller 10 performs various processing in response to a command from the host computer 80. For example, when a read command for requesting transferring of particular data written on the disk 90 is supplied from the host computer 80, first, seek operation control is performed for the target of the indicated address. That is, an instruction is issued to the servo processor 14 so that an access operation of the pickup 1, in which the address indicated by the seek command is a target, is performed.

Thereafter, operation control required to transfer the data in the indicated data section to the host computer 80 is performed. That is, reading of data from the disk 90, decoding, buffering, etc., are performed so as to transfer required data.

In a case in which data request from the host computer is performed sequentially and the requested data is stored in the cache memory 20, for example, by a prefetch reading operation, the requested data can be transferred without performing reading of data from the disk 90, decoding, buffering, etc. in cache hit transfer.

The focusing jump operation which is a characteristic operation in this example is performed under the control of the system controller 10. Furthermore, in order that the system controller 10 performs control of focusing jump sequence, the focusing error signal FE must be monitored. For this purpose, the focusing error signal FE from the RF amplifier 9 is also supplied to the system controller 10.

The case where the S-shaped curve is observed in the focusing error signal FE is a case in which an appropriate amount of reflected light is obtained by the photodetector 5. At this time, also as the sum signal of what is commonly called an "amount of reflected light", the level increases. The output such that this sum signal is compared with a predetermined threshold level is what is commonly called an "FOK signal" indicating the section of the S-shaped curve. The system controller 10 may also monitor this FOK signal in the process as shown in FIG. 4 (to be described later).

Figure 4:
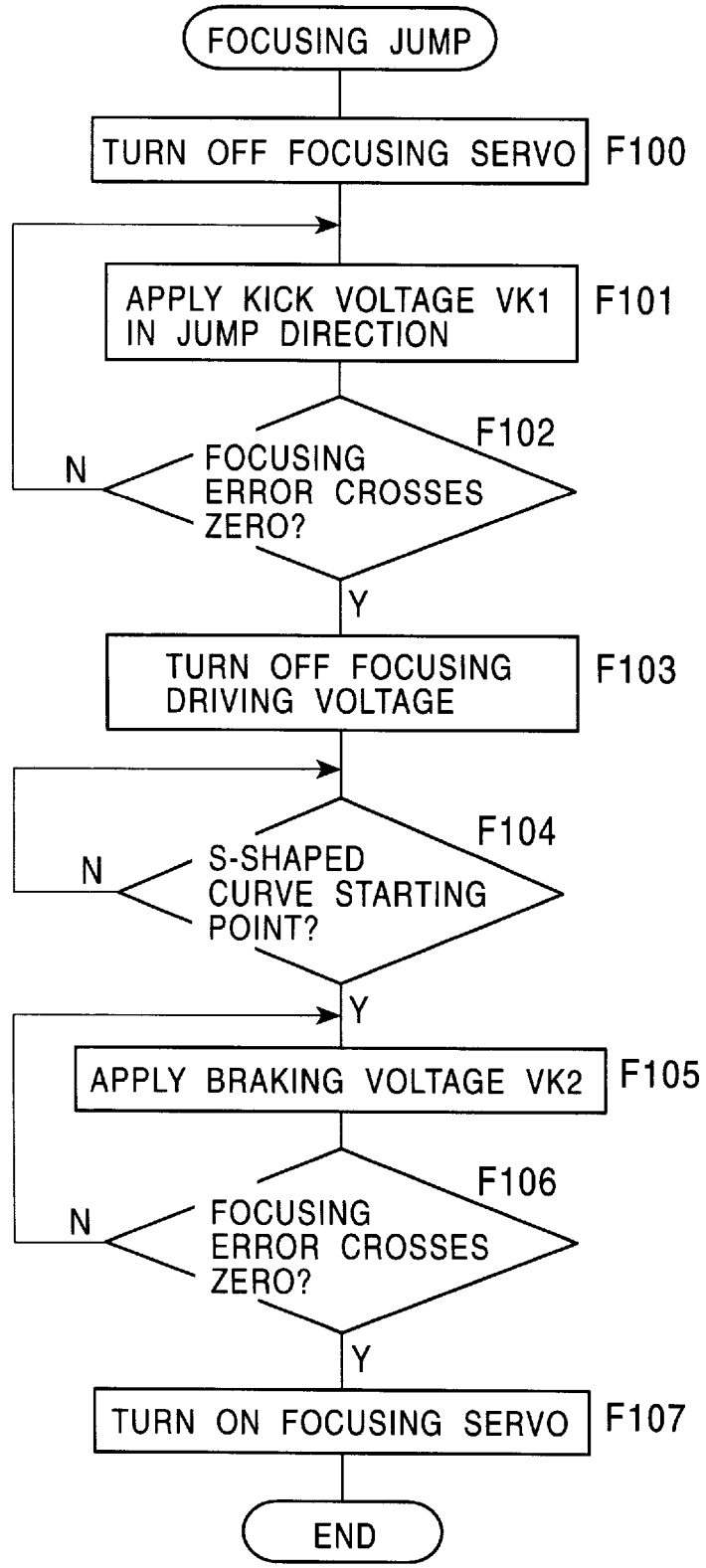
FIG. 4 is a flowchart of the focusing jump operation according to the embodiment of the present invention.

In the example of the process of FIG. 4, the processing is made to proceed by performing zero-cross detection of the focusing error signal FE. The zero-cross of this focusing error signal refers to a zero-cross point within the S-shaped curve. However, in practice, as can be seen from the waveform of FIG. 3, the focusing error signal FE becomes nearly zero in an area other than the S-shaped curve area, in which reflected light cannot be obtained appropriately. Even if the focusing error signal is simply compared with the zero level while the objective lens is being moved, there are cases where the zero-cross point in the S-shaped curve area cannot be detected accurately. Therefore, in order to eliminate zero-cross in an area other than the S-shaped curve area, zero-cross detection may be performed by using an FOK signal as a window.

Figure 5:
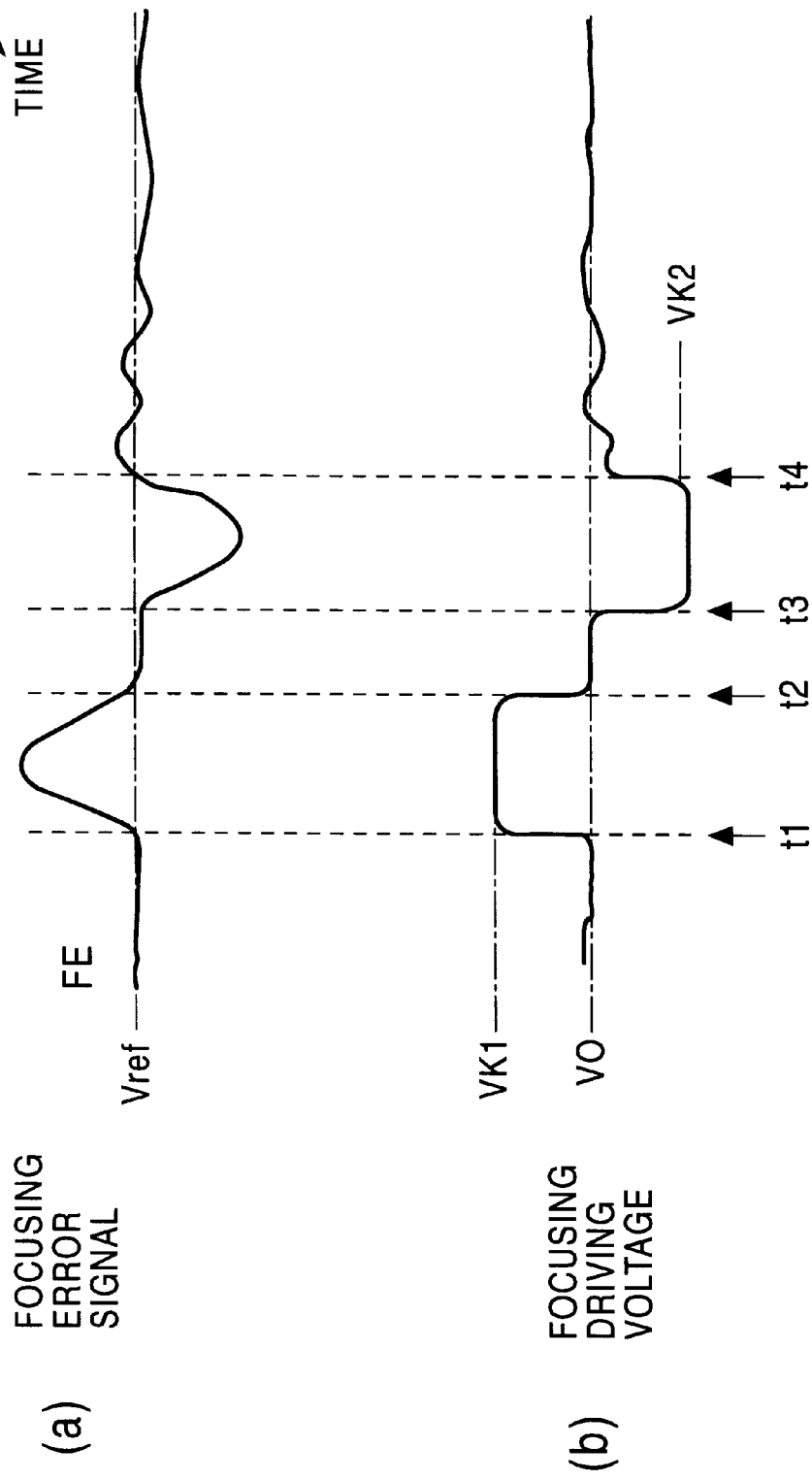
FIG. 5 is an illustration of the focusing jump operation according to the embodiment of the present invention.

Referring to FIGS. 4 and 5, the operation during focusing jump is described.

FIG. 4 shows the process of the system controller 10 during focusing jump. FIG. 5 shows an example of the focusing error signal FE during focusing jump, and an example of a focusing driving voltage applied to the two-axis driver 16 by the servo processor 14.

The waveforms of FIG. 5 show the case of a focusing jump operation (focusing jump in a direction toward the disk 90) in which a change is made from the state of the part (a) of FIG. 2 to the state of the part (b) of FIG. 2.

When performing focusing jump, initially, the system controller 10 performs control for turning off the focusing servo which has been applied thus far in step F100 of FIG. 4. That is, an instruction is given to the servo processor 14 so that the focusing servo loop is opened.

Next, in step F101, a kick voltage VK1 in the direction of focusing jump is applied to the two-axis driver 16. Thereupon, at time t1 shown in FIG. 5 and thereafter, the objective lens 2 is moved in a direction toward the disk 90.

Also, as a result of the kick voltage VK1 being applied by the process of step F101, at time t1 and thereafter, the objective lens 2 is moved in a direction toward the disk 90. At this time, in step F102, the system controller 10 waits for the timing at which zero cross of the focusing error signal is next observed.

This zero-cross timing corresponds to the timing of time t2 of FIG. 5, that is, the timing at which the objective lens 2 escapes the positional range where the S-shaped curve with respect to the first signal recording surface 90a is observed.

When this timing is detected, the system controller 10 turns off the focusing driving voltage in the process of step F103. Therefore, the objective lens 2 moves in a direction toward the disk 90 due to the inertial force at time t2 and thereafter.

In this state, in step F104, the system controller 10 waits for the timing at which the next S-shaped curve starts to be observed. That is, as a result of the movement of the objective lens 2, for the focusing error signal FE, an S-shaped curve with respect to the second signal recording surface 90b is observed from a particular time, and the start timing is detected. This start timing of the S-shaped curve can be detected by comparing, for example, the focusing error signal FE with a particular predetermined level close to zero.

In the case of FIG. 5, time t3 is the timing which is detected as the start of the S-shaped curve in step F104, and from this time, the process of the system controller 10 proceeds to step F105. Then, a braking voltage VK2 is applied to the two-axis driver 16. The braking voltage refers to a kick voltage in a direction opposite to the focusing jump direction, and in this case, is a kick voltage in a direction away from the disk 90.

However, since the objective lens 2 is in the midst of moving in a direction toward the disk 90 when the braking voltage VK2 is applied, the application of the braking voltage VK2 appears as a decrease in the movement speed of the objective lens 2 in a direction toward the disk 90. Therefore, at time t3 and thereafter, movement speed of the objective lens 2 is decreased, but approaches the disk 90, similarly to that described thus far.

Here, a braking voltage VK3 is applied at the time when the S-shaped curve with respect to the second signal recording surface 90b is begun to be observed. Therefore, since the movement of the objective lens 2 is continued as it is even though the speed decreases, the zero-cross of the focusing error signal at a particular time after that is detected. This zero-cross detection is a process of step F106 and is at the timing of time t4 with reference to FIG. 5.

The position of the objective lens 2 before and after this zero-cross detection corresponds to before and after position P2 in FIG. 2, that is, the focusing pull-in range with respect to the second signal recording surface 90b. Therefore, if the process is made to proceed to step F107 where the focusing servo loop is turned on, the focusing servo with respect to the second signal recording surface 90b is satisfactorily pulled in, and thereafter, the focused state with respect to the second signal recording surface 90b is maintained by the focusing search operation. This completes the focusing jump from the first signal recording surface 90a onto the second signal recording surface 90b.

In the present invention, when performing such a focusing jump operation, stable jump control is performed efficiently in response to the wobble of the disk 90.

An example of a wobble detection method performed in the wobble detection section 30 shown in FIG. 1 is described below.

Figure 6:
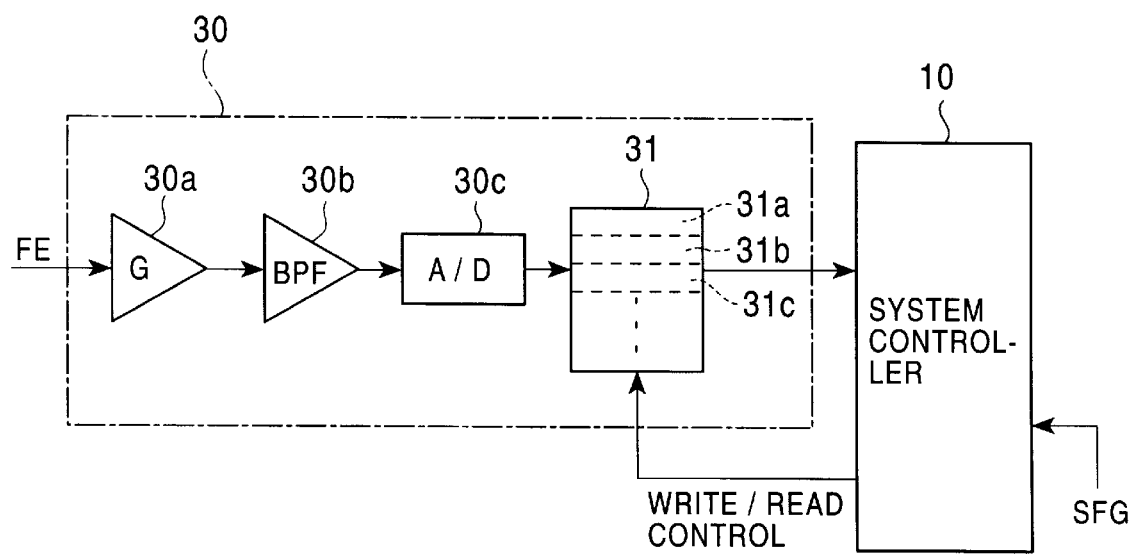
FIG. 6 is a block diagram illustrating an example of the construction of a wobble detection section shown in FIG. 1.

FIG. 6 is a block diagram illustrating an example of the construction of the wobble detection section 30, together with the system controller 10 shown in FIG. 1.

The focusing error signal FE supplied to the wobble detection section 30 is converted into digital data by an A/D conversion device 30c, for example, via a gain amplifier 30a and a band-pass filter 30b in accordance with the wobble frequency, and is stored in a memory 31.

In the memory 31, storage areas corresponding to an FG pulse SFG output from the spindle FG 6a in accordance with one rotation cycle of the spindle motor 6 are formed, for example, as shown as memory areas 31a, 31b, 31c, etc. Then, the value of the focusing error signal FE corresponding to the timing of the FG pulse SFG is stored under the control of the system controller 10. As a result, the level of the focusing error signal corresponding to one rotation of the spindle motor 6, that is, one rotation of the disk 90, can be obtained.

In the system controller 10, the focusing error signal stored in each of the memory areas 31a, 31b, 31c, etc., in the memory 31 in this manner is read, for example, on the basis of a predetermined FG pulse which is a reference for one rotation in the spindle FG 6a, making it possible to detect the amount of wobble in the disk 90 from the level of the read focusing error signal.

Figure 7:
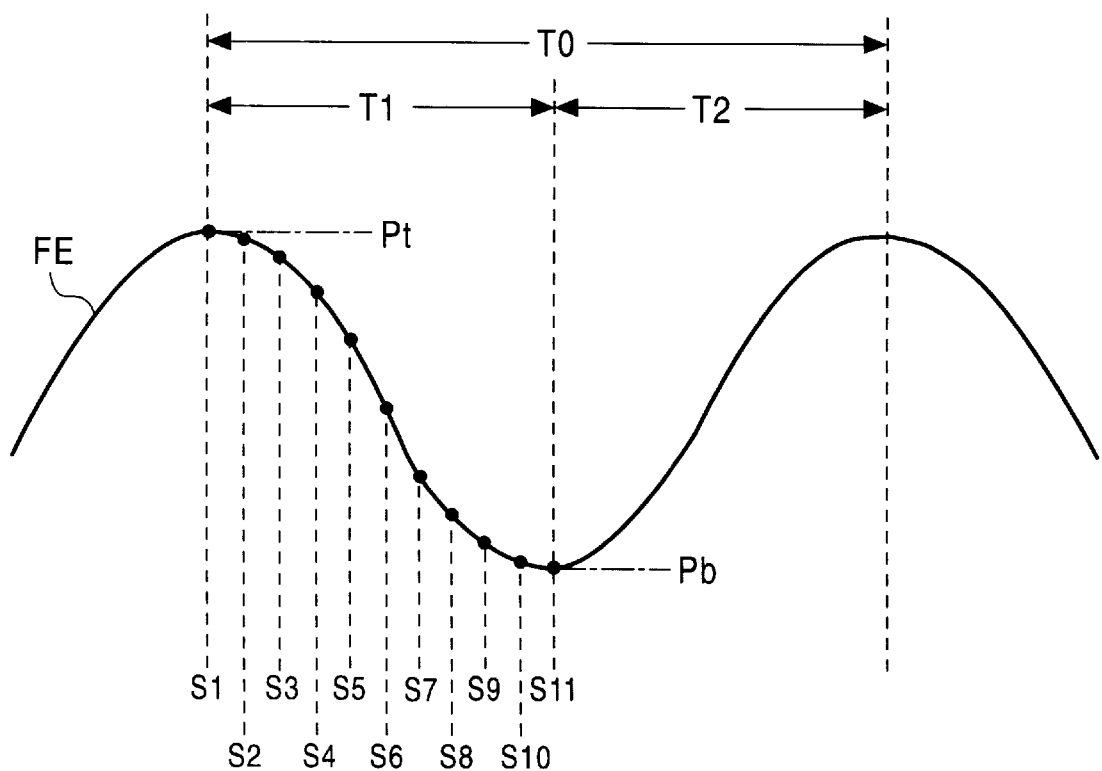
FIG. 7 is a schematic diagram illustrating an example in which wobble detection is performed by the wobble detection section.

FIG. 7 shows an example in which wobble is detected in accordance with the focusing error signal detected in response to the wobble by the wobble detection section shown in FIG. 6. The cycle T1 shown in the figure is, for example, one rotation cycle of the spindle motor 6 based on the FG pulse SFG output from the spindle FG 6a in response to the rotation of the spindle motor 6, that is, one-half of one rotation cycle T0 of the disk 90.

When the focusing error signal FE, such as that shown in FIG. 7, is input to the wobble detection section 30, the value of the A/D-converted focusing error signal is stored in the memory areas 31a, 31b, 31c, etc., in the memory 31, for example, at timings S1 to S11 corresponding to the FG pulse SFG. The data stored in the memory areas 31a, 31b, 31c, etc., at timings from S1 to S11 is called "wobble information". Also, as timings from S1 to S11, timings of only one-half of a rotation cycle in cycle T1 are shown in the figure.

Wobble information corresponding to the focusing error signal input at timings from S1 to S11 shown in FIG. 7 is stored in the memory 31. The system controller 10 determines the maximum and minimum values in the wobble information within a predetermined period (cycle T1) within one rotation cycle T0 read from the memory 31. In the example shown in the figure, wobble information Pt corresponding to timing S1 is determined to be the maximum value, and wobble information Pb corresponding to timing S11 is determined to be the minimum value.

More specifically, the difference between the wobble information Pt and the wobble information Pb may be a level corresponding to the amount of wobble of the disk 90, and when the difference between the wobble information Pt and Pb is large, the amount of wobble may be assumed to be large, and when the difference between the wobble information Pt and Pb is small, the amount of wobble may be assumed to be small.

As described above, for example, by detecting the level of the focusing error signal FE in a predetermined period of one rotation cycle of the disk 90, the amount of wobble in the disk can be determined from the maximum value and the minimum value.

In this specification, although in the foregoing an example is described in which the amount of wobble is detected based on the focusing error signal FE, the amount of wobble can also be detected in a similar manner by using a focusing driving signal generated by the servo processor 14 on the basis of the focusing error signal FE.

In this example, required control during a focusing jump operation, such as that shown below, is performed based on the wobble information determined in this manner.

(1) Movement of focusing jump position
(2) Feed-forward of wobble information
(3) Maintaining position of objective lens
(4) Decreasing speed in accordance with the amount of wobble (1) Movement of Focusing Jump Position The wobble in the disk 90 increases toward the periphery of the disk 90. That is, in the central area of the disk 90, wobble is believed to be relatively small. Therefore, by performing focusing jump control in the central area where wobble is small, stable shift from one signal recording surface to another can be performed.

Figure 8:
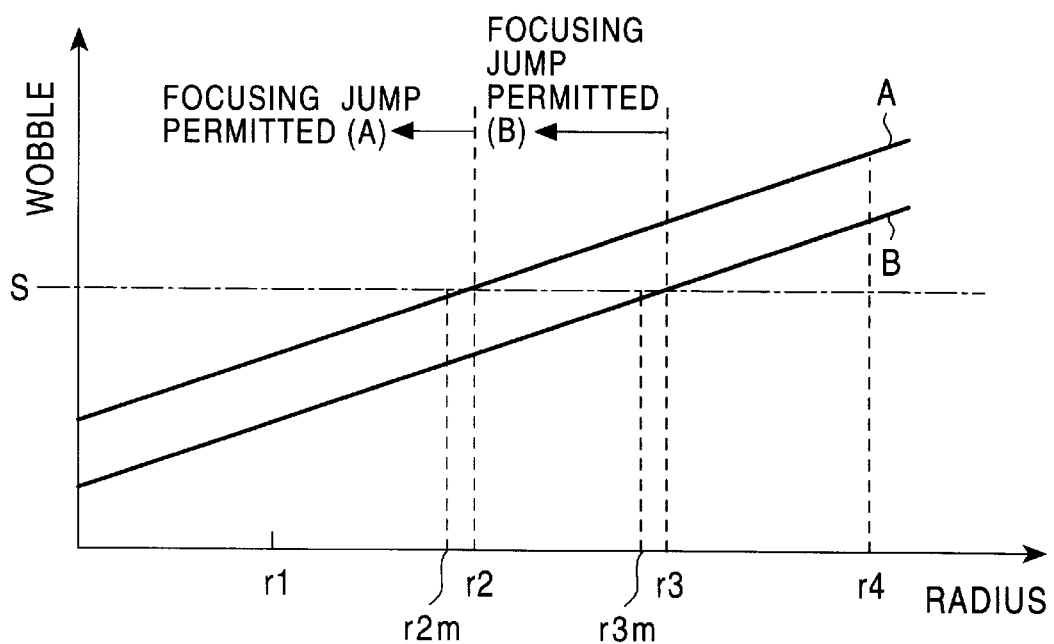
FIG. 8 is an illustration of an example in which focusing jump is performed after an objective lens is moved to a predetermined radial position in accordance with the amount of wobble.

FIG. 8 is a schematic diagram showing an example of the relationship between the position of the disk 90 in the radial position and the wobble thereof. The vertical axis indicates the amount of wobble, and the horizontal axis indicates the radial position from the center of the disk 90. As radial positions, r1, r2, r3, and r4 are shown from the central area toward the periphery. The wobble corresponding to each position increases toward the periphery of the disk 90, and it is apparent that it becomes progressively difficult to stably perform the focusing jump operation toward the periphery.

Accordingly, when the objective lens 2 is positioned at the periphery of the disk 90, control is performed so that, for example, the optical pickup 1 is first moved toward the central area by a seek operation. As a result, when a focusing jump is performed, the objective lens 2 can be moved to a position at which the influences of wobble are small.

In this case, when a predetermined threshold value is set for the amount of wobble and the focusing jump is performed, the system controller 10 selectively performs control so that focusing jump is performed at that location or the focusing jump is performed after moving to the central area on the basis of this threshold value. In the example shown in FIG. 8, as a result of setting a threshold value S indicated by the single-dot-chain line, by using position r2 along the radius as a reference, focusing jump is not performed in areas more peripheral than position r2.

For example, a case is considered in which the disk 90 has a relationship between the amount of wobble indicated by "A" and the radial position. In this case, when the objective lens 2 is positioned at an area more peripheral than position r2, for example, when focusing jump is ordered from the host computer 80, the system controller 10 performs control so that the objective lens 2 is moved to an area more radially inward than position r2 (focusing jump permitted position (A)) where the amount of wobble is smaller than the threshold value S, and the focusing jump is performed. In practice, focusing jump is performed at position r2m which is a position in the central area in which a predetermined margin with respect to position r2 is taken into consideration.

Also, a case is considered in which, for example, the wobble of the disk 90 shown at (B) is smaller than at (A). In this case, when, for example, focusing jump is ordered from the host computer 80, control may be performed so that the focusing jump is performed after the objective lens 2 is moved to a region radially inward than position r3 (focusing jump permitted position (B)) where the amount of wobble is smaller than the threshold value S. Also in this case, in practice, focusing jump is performed at position r3m which is a position in the central area in which a predetermined margin with respect to position r3 is taken into consideration.

Movement toward the central area in these cases is performed, for example, by controlling the sled mechanism 8.

In addition, the amount of wobble at a predetermined radial position of the disk 90 may be detected in advance and stored by the wobble detection method described earlier, for example, when the disk 90 is loaded into the disk drive apparatus 70. This makes it possible to determine in advance the relationship between the amount of wobble of the disk currently loaded in the disk drive apparatus and the radial position thereof. When focusing jump is performed with respect to the disk, the radial position at which the objective lens 2 should be moved can be ascertained. That is, by retrieving the value corresponding to the amount of wobble in which the focusing jump is permitted from the prestored amount of wobble, it is possible to recognize the movement target position of the objective lens 2.

As described above, when the objective lens 2 is at a radial position of the disk 90, for example, at a position at the periphery where the wobble is relatively large, by performing focusing jump after the optical pickup 1 is moved to the central area in accordance with the amount of wobble of the disk, a stable jump operation can be performed without being affected by wobble.

(2) Feed-forward of Wobble Information

An example is now described in which kick/braking control is performed in a state in which wobble information (focusing error signal) is feed-forwarded so as to follow wobble when focusing jump is to be performed.

Figure 9:
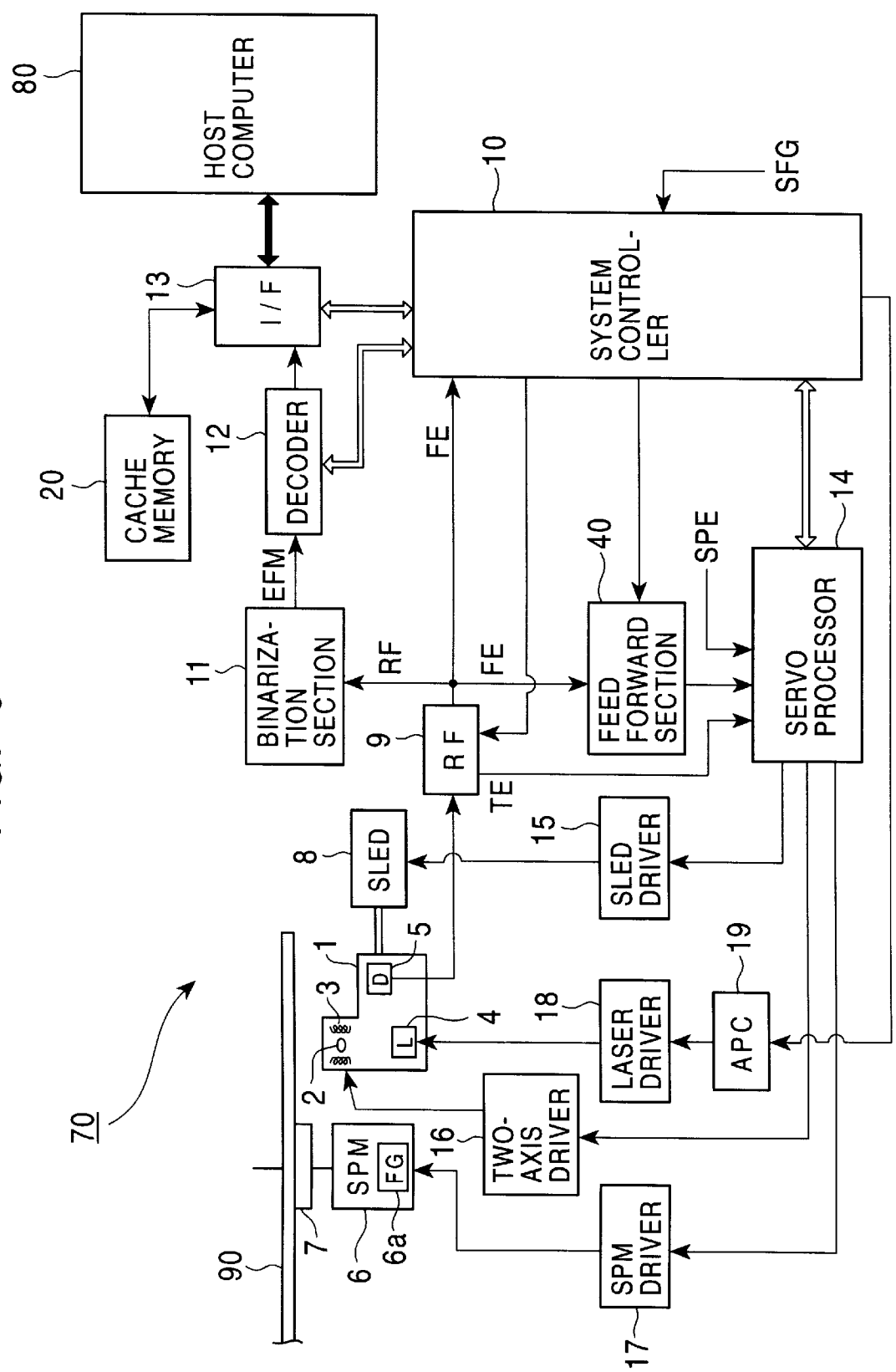
FIG. 9 is a block diagram illustrating another example of the construction of a disk drive apparatus according to the present invention.

FIG. 9 shows an example of the construction in which the disk drive apparatus 70 comprises a feed-forward section 40. Components in FIG. 9 having the same reference numerals as those in FIG. 1 are the same, and accordingly, descriptions thereof are omitted for brevity. Regarding the signal path from the RF amplifier 9 to the servo processor 14, for the sake of convenience, the tracking error signal TE and the focusing error signal FE are shown separately.

The feed-forward section 40 inputs the focusing error signal FE output from the RF amplifier 9, outputs the input focusing error signal FE as it is during a normal operation, and outputs a focusing error signal, corresponding to wobble, prestored in a memory during focusing jump. Such selection control for output signals is performed, for example, by the system controller 10.

Figure 10:
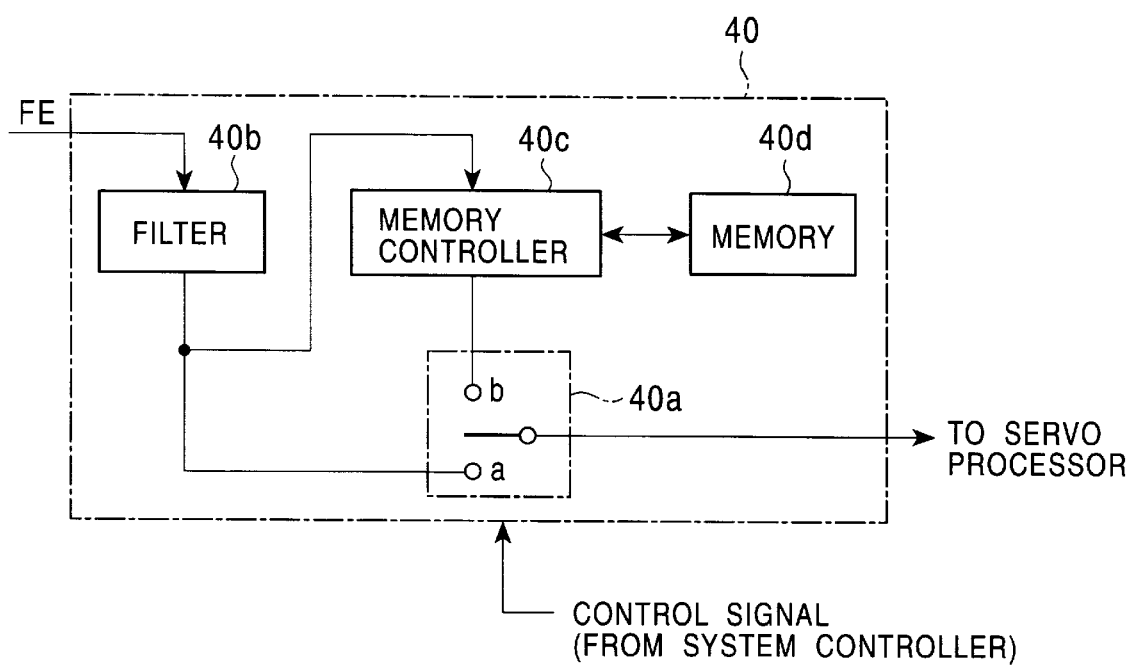
FIG. 10 is an illustration of an example of the construction of a feed-forward section shown in FIG. 9.

FIG. 10 shows, in a functional block diagram, an example of the construction of the feed-forward section 40.

In a switch 40a shown in the figure, a switching operation is performed, for example, in accordance with a control signal of the system controller 10, and a terminal "a" is selected during a normal operation (for example, reading, writing, etc.). Therefore, the focusing error signal FE input from the RF amplifier 9 is subjected to A/D conversion, frequency-band limitation, etc., for example, in a filter section 40b, after which the signal is supplied to the servo processor 14 via the switch 40a. The RF amplifier 9 and the servo processor 14 are not shown in the figure.

The focusing error signal FE passing through the band-pass filter 40b is also supplied to a memory controller 40c, and waveform data, for example, for one cycle (for one rotation of the disk) is stored in a memory 40d.

For example, when focusing jump is to be performed in accordance with an instruction from the system controller 10, the switch 40a is switched to terminal "b" in a period in which focusing jump is performed, so that the focusing error signal read from the memory 40d by the memory controller 40c is supplied to the servo processor 14.

When reading the focusing error signal stored in the memory 40d, the memory controller 40c reads the focusing error signal FE from the memory 40d in synchronization with the rotation of the disk 90 and outputs it. This is realized, for example, by performing a reading process synchronized with the FG pulse from the spindle FG 6a. As a result, during the normal operation, the focusing error signal FE from the RF amplifier 9 is output, and when focusing jump is to be performed, the focusing error signal prestored in the memory 40d is output to the servo processor 14.

Figure 11:
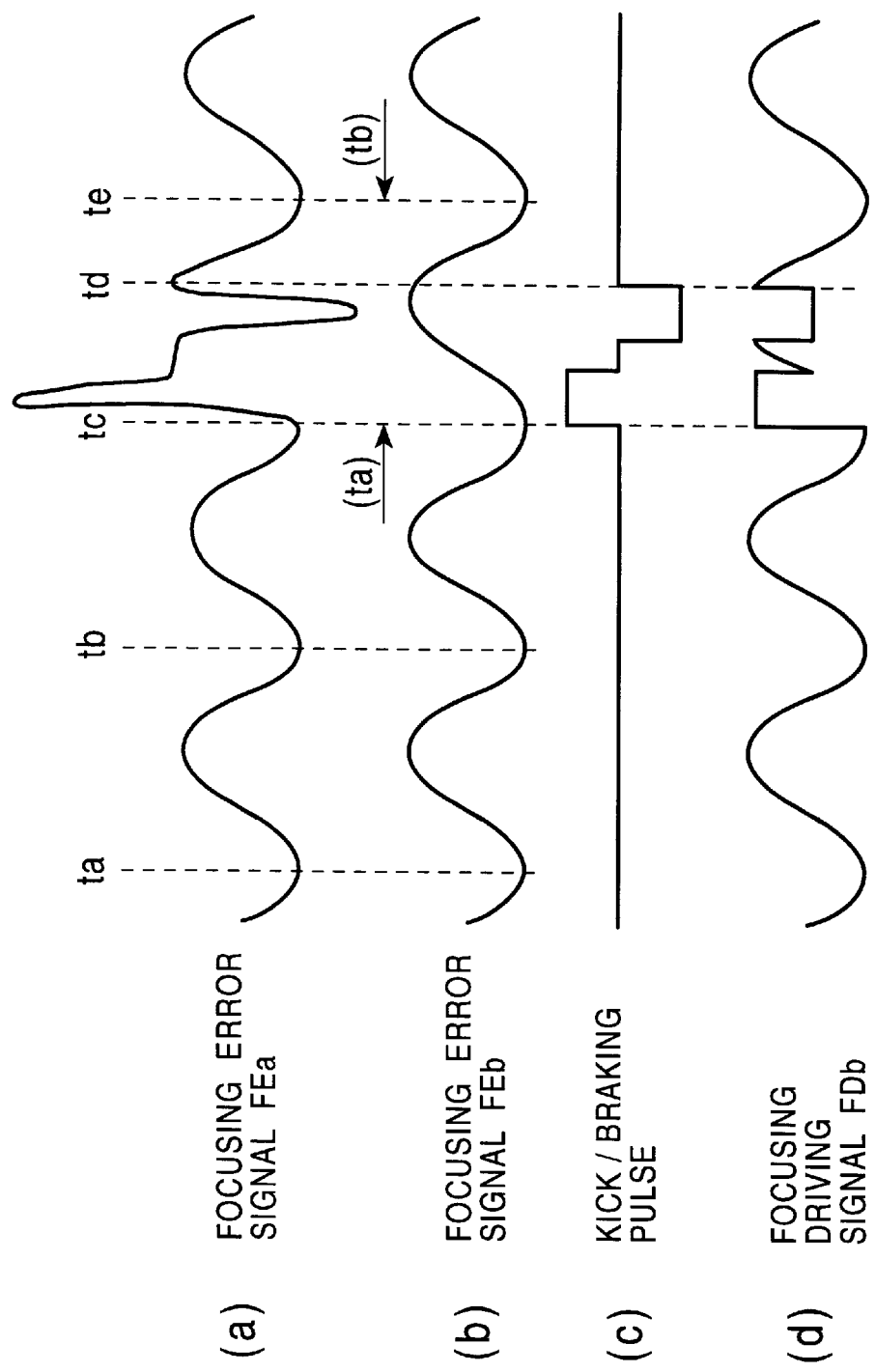
FIG. 11 is an illustration of examples of a focusing error signal and a focusing driving signal in a case in which the feed-forward section is used.

FIG. 11 schematically shows waveforms of various signals in a case in which focusing jump is performed in accordance with a feed-forwarded focusing error signal.

Conventionally, when focusing jump is to be performed, the focusing error signal FE becomes as shown in part (a) of FIG. 11. For example, in a period ("ta" to "tc") immediately before focusing jump is performed, a waveform corresponding to the wobble is formed, and in a period ("tc" to "td") in which focusing jump is performed, the signal level changes in response to the movement of the objective lens 2. When the focusing jump is terminated, a waveform corresponding to the wobble is formed again, as shown from time "td" and thereafter. The focusing error signal FE shown in part (a) of FIG. 11 corresponds to the waveform of the focusing error signal shown earlier in part (a) of FIG. 5.

However, in this example, the feed-forward section 40 is provided, so that the focusing error signal corresponding to one cycle corresponding to one rotation of the disk 90 is prestored in the memory 40d, for example, as shown as the period "ta" to "tb" in part (a) of FIG. 11. Then, when focusing jump is to be performed, a signal such as that shown in part (b) of FIG. 11 is output as the focusing error signal. Thereafter, a description is given by denoting the focusing error signal shown in part (a) of FIG. 11 as FEa, and by denoting the focusing error signal shown in part (b) of FIG. 11 as FEb.

The focusing error signal FEb is shown as an example in which a focusing error signal corresponding to, for example, the period "ta" to "tb", is prestored in the memory 40d, and this stored focusing error signal in a predetermined period is read and output, for example, in accordance with an instruction from the system controller 10 by using the timing "tc" at which focusing jump is started as the starting point. In part (b) of FIG. 11, an example is shown, for the sake of convenience, in which the signal level immediately before focusing jump is performed is feed-forwarded. However, the timing at which the focusing error signal is stored in the memory 40d is not limited to such a timing immediately before the jump.

For example, the fact that a degree of wobble differs depending on the radial position has been stated earlier. In order to deal with such wobble differences, when the optical pickup 1 is moved to a predetermined radial position, a storing operation for the memory 40d may be performed regardless of the presence or absence of the execution of focusing jump.

In this manner, the focusing error signal FEb output from the feed-forward section 40 is supplied to the servo processor 14.

Also, when focusing jump is to be performed, a kick/braking pulse is supplied from the system controller 10 to the servo processor 14 so as to perform the focusing jump operation of the objective lens 2. This kick/braking pulse is supplied from the system controller 10 to the servo processor 14 at the timing "tc" at which focusing jump is ordered, as shown in part (c) of FIG. 11. Then, the servo processor 14 adds the focusing error signal FEb to the kick/braking pulse in order to generate a focusing driving signal FDb.

This focusing driving signal FDb becomes a signal which follows the wobble while causing the objective lens 2 to perform focusing jump. Therefore, by supplying such a focusing driving signal FDb to the two-axis driver 16, the objective lens 2 can be moved so that a stable focusing jump is performed while following the wobble.

As described above, when wobble information is feed-forwarded, since the objective lens 2 also follows wobble when focusing jump is performed, even when the disk 90 is rotating, for example, at a high speed, a stable jump operation can be performed.

(3) Maintaining Position of Objective Lens

An example in which the movement of the signal surface, which is at the focus, is performed without moving the objective lens 2, is described below. Although in the above-described embodiment, an example is described in which the focusing jump operation is performed with respect to a predetermined signal recording surface in order for the objective lens 2 itself to obtain the focus, in this example, waiting is done for the signal recording surface of the disk 90 to correspond to the focus position due to wobble while maintaining the position of the objective lens 2. Also in this example, since the focus position of the objective lens 2 is moved from the current signal recording surface to another signal recording surface, for the sake of convenience, this is called a "focusing jump operation".

The disk drive apparatus for realizing this example is constructed as shown in FIG. 1. This is realized, for example, by maintaining, by the servo processor 14, the focusing driving signal at a predetermined level, for example, in accordance with an order from the system controller 10 at the timing at which focusing jump is performed.

Figure 12:
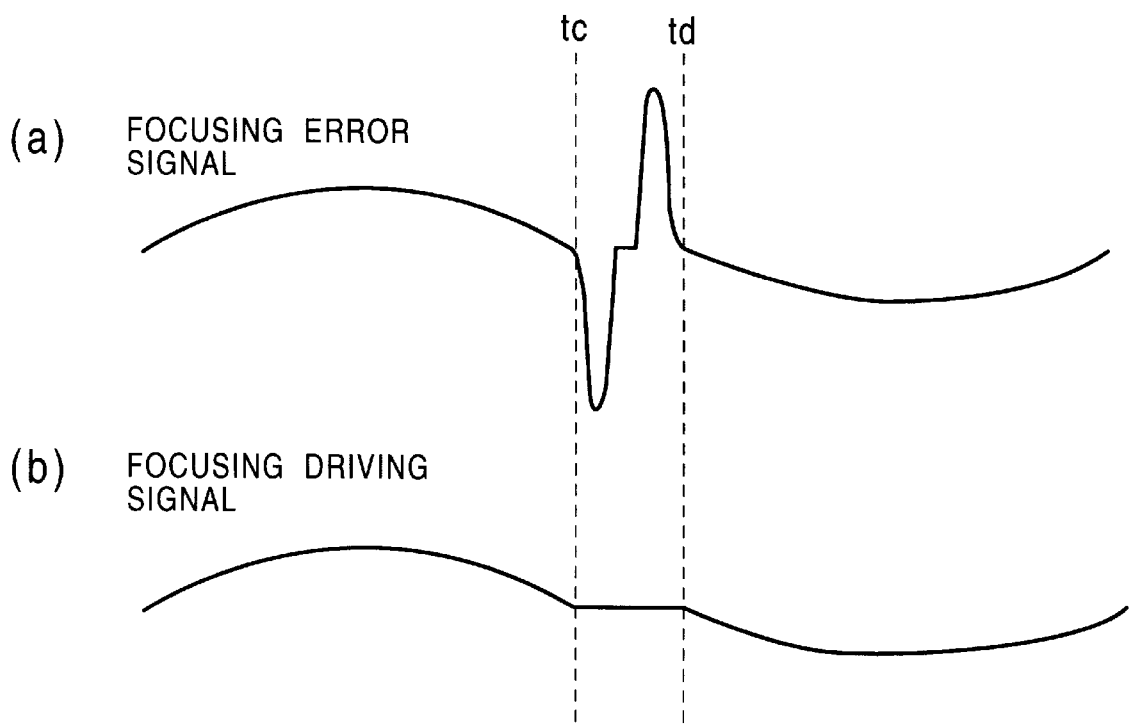
FIG. 12 is an illustration of examples of a focusing error signal and a focusing driving signal in a case in which the focus is moved from the current signal recording surface to another signal recording surface without moving an objective lens.

FIG. 12 schematically shows, in parts (a) and (b), an example of a focusing error signal and a focusing driving signal during focusing jump. Also in this example, similarly to that in FIG. 11, it is shown that the focusing jump is performed in the period "tc" to "td".

As shown in part (a) of FIG. 12, when focusing jump is started, in the focusing error signal, similarly to the example shown in part (b) of FIG. 11, a level variation indicating that the objective lens 2 deviates from the focus position of the signal recording surface of the disk 90 appears. At this time, in the servo processor 14, for example, a focusing driving signal in response to a focusing error signal is not generated in accordance with an order from the system controller 10, and the level of the focusing driving signal at timing "tc" at which focusing jump is performed is maintained.

Therefore, in the period "tc" to "td" in which focusing jump is being performed, the focusing driving signal is a signal whose voltage level is maintained, as shown in part (b) of FIG. 12. Further, at timing "td" at which the focusing jump is terminated and thereafter, the servo processor 14 again generates a focusing driving signal in accordance with the focusing error signal so that the focusing servo is activated with respect to the signal recording surface after the focusing jump.

Figure 13:
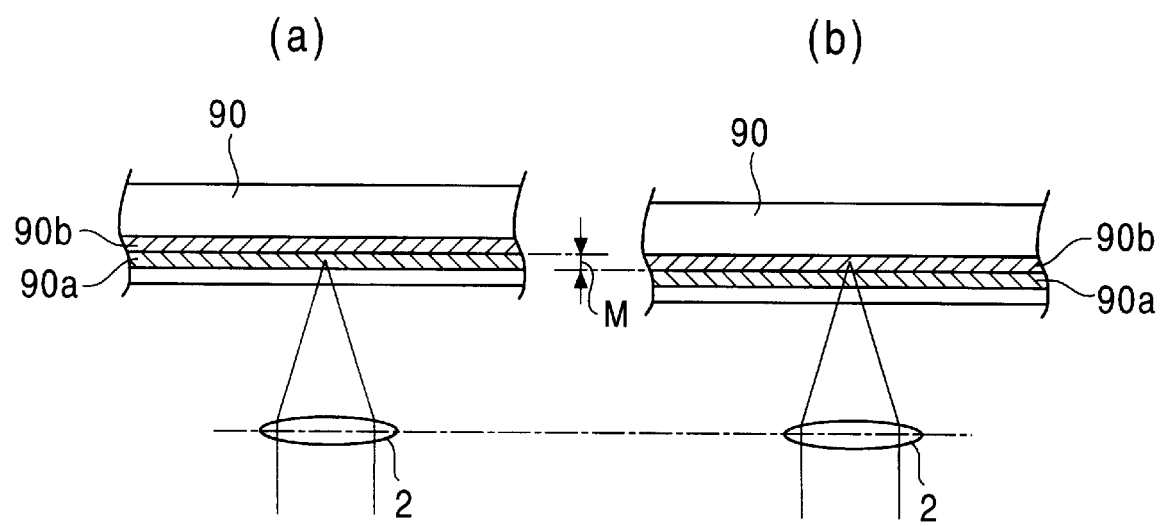
FIG. 13 is a schematic diagram illustrating the positional relationship between an objective lens and the signal recording surface of a disk in a case in which the focus is moved from the current signal recording surface to another signal recording surface without moving the objective lens.

FIG. 13 is a schematic diagram illustrating, in parts (a) and (b), the positional relationship between the objective lens 2 and the signal recording surface of the disk 90 in the period "tc" to "td", shown in parts (a) and (b) of FIG. 12.

Part (a) of FIG. 13 shows, for example, the focused state on the first signal recording surface 90a, which is a state before timing "tc" in part (a) of FIG. 12. In this state, for example, when the execution of focusing jump is ordered by the system controller 10, etc., the objective lens 2 is held by the focusing driving signal shown in part (b) of FIG. 12, and the position is maintained. Here, if the amount of wobble of the disk 90 is denoted by "M", the signal recording surface approaches the objective lens 2 on the basis of this amount "M" of wobble. That is, when the disk 90 rotates once, the positional relationship between the objective lens 2 and the disk 90 is changed between the states shown in part (a) of FIG. 13 and in part (b) of FIG. 13.

Therefore, when part (b) of FIG. 13 shows a position (zero cross) at which the objective lens 2 and the second signal recording surface 90b are at a focused state, pull-in of focus is started at this position. As a result, the focusing servo can be applied to the second signal recording surface 90b at the position shown in part (b) of FIG. 13.

As described above, in the third embodiment, when focusing jump is performed, waiting is done for the target second signal recording surface 90b to approach due to wobble of the disk 90 while the position of the objective lens 2 is maintained, and then, pull-in of focus is performed. That is, since the objective lens 2 is not moved with respect to the disk 90 which is wobbling, inadvertent contact between the objective lens 2 and the disk 90 can be avoided, and a stable focusing jump can be performed. This makes it possible to improve the reliability of the disk drive apparatus 70.

(4) Decreasing Speed in Accordance with Amount of Wobble

In the disk drive apparatus constructed as shown in FIG. 1, since the apparatus comprises the wobble detection section 30, when focusing jump is to be performed, driving control of the spindle motor 6 may be performed in accordance with the amount of wobble detected by the wobble detection section 30 so that the rotation speed of the disk 90 is decreased until it reaches a rotation speed at which influences of wobble are not received.

More specifically, when the difference between the wobble information Pt and Pb shown in FIG. 7 is large, the amount of wobble is assumed to be large, and focusing jump is performed in a state in which the spindle motor 6 is controlled so as to rotate at a relatively low speed. Also, when the difference between the wobble information Pt and Pb is small, the amount of wobble is assumed to be small, and focusing jump is performed in a state in which the spindle motor 6 is controlled so as to rotate at a relatively high speed. As a result, focusing jump can be performed in a state in which the rotation of the disk 90 is stable without being influenced by wobble.

In this case, since driving control of the spindle motor 6 by the servo processor 14 may be simply performed, it is possible to perform a stable focusing jump relatively easily.

In the present invention, in a manner as described in the above-described first to fourth embodiments, focusing jump is performed in accordance with the wobble of the disk 90, making it possible to move the focus from a current signal recording surface to another signal recording surface. Therefore, it is possible to stably read a disk on which two signal recording surfaces called, for example, "layer 0" and "layer 1", are formed.

As shown in FIG. 7, the timing of the peak of the focusing error signal FE detected in the wobble detection section 30 is such that the wobbling speed due to wobble is nearly at the minimum. In the example shown in FIG. 7, these may be timings shown as wobble information Pt and wobble information Pb. This timing can be determined based on the levels of the wobble information and the FG pulse SFG.

More specifically, when an order to perform focusing jump is received from the host computer 80, etc., an actual focusing jump operation may be performed at this timing corresponding to the wobble information Pt or the wobble information Pb in the rotation cycle of the disk 90. This makes it possible to reliably perform a focusing jump operation in which the influences of wobble are minimized.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claimed is:

1. An apparatus for writing and/or reading data by emitting laser light on each signal recording surface of a recording medium having a plurality of signal recording surfaces, said apparatus comprising:

pickup means having an objective lens which is at an output end of said laser light;

objective lens moving means for setting the focused state of the laser light with respect to the signal recording surface of the recording medium by moving said objective lens toward or away from the recording medium;

focus error signal generating means for generating a focus error signal indicating a focusing error between said objective lens and said signal recording surface;

detection means for receiving said focus error signal and detecting moved distance information indicating the relative distance moved between said objective lens and said signal recording surface based on said focus error signal, said relative distance moved caused by a wobbling of the surface of the recording medium when the recording medium rotates; and focusing jump control means for controlling said objective lens moving means so that a focusing jump operation is performed for moving the focus position of said objective lens from the current signal recording surface to another signal recording surface, wherein said focusing jump control means performs said focusing jump operation at a position where said relative distance moved with respect to said recording medium is not more than a predetermined value.

2. An apparatus according to claim 1, wherein said focusing jump control means moves said pickup means radially inward toward a central area of a disk as the recording medium, after which said focusing jump control means causes said pickup means to perform said focusing jump operation.

3. An apparatus according to claim 1, wherein said focusing jump control means causes said focusing jump operation to be performed based on a predetermined threshold value for said moved distance information and the moved distance information detected by said detection means.

4. An apparatus according to claim 1, wherein said detection means detects the level of a focusing error signal as said moved distance information.

5. An apparatus according to claim 1, further comprising rotation speed control means for rotating a disk as said recording medium at a predetermined rotation speed when data is written and/or read,
wherein said rotation speed control means rotates said disk at a speed corresponding to said moved distance information.

6. An apparatus for writing and/or reading data by emitting laser light on each signal recording surface of a recording medium having a plurality of signal recording surfaces, said apparatus comprising:
pickup means having an objective lens which is at an output end of said laser light;
objective lens moving means for setting the focused state of the laser light with respect to the signal recording surface of the recording medium by moving said objective lens toward or away from the recording medium;
focus error signal generating means for generating a focus error signal indicating a focusing error between said objective lens and said signal recording surface;
detection means for receiving said focus error signal and detecting moved distance information indicating the relative distance moved between said objective lens and said signal recording surface based on said focus error signal, said relative distance moved caused by a wobbling of the surface of the recording medium when the recording medium rotates;
focusing jump control means for controlling said objective lens moving means so that a focusing jump operation is performed for moving the focus position of said objective lens from the current signal recording surface to another signal recording surface; and
storage means for storing said moved distance information within a predetermined period,
wherein said focusing jump control means controls said objective lens moving means in accordance with moved distance information stored in said storage means and a driving signal for a focusing jump operation.

7. An apparatus according to claim 6, wherein said storage means stores said moved distance information in a period corresponding to a cycle of a surface wobbling which occurs when a disk as the recording medium rotates.

8. An apparatus according to claim 6, wherein said detection means detects the level of a focusing error signal as said moved distance information.

9. An apparatus according to claim 6, further comprising rotation speed control means for rotating a disk as said recording medium at a predetermined rotation speed when data is written and/or read,
wherein said rotation speed control means rotates said disk at a speed corresponding to said moved distance information.

10. An apparatus for writing and/or reading data by emitting laser light on each signal recording surface of a recording medium having a plurality of signal recording surfaces, said apparatus comprising:
pickup means having an objective lens which is at an output end of said laser light;
objective lens moving means for setting the focused state of the laser light with respect to the signal recording surface of the recording medium by moving said objective lens toward or away from the recording medium; and
focus error signal generating means for generating a focus error signal indicating a focusing error between said objective lens and said signal recording surface;
detection means for receiving said focus error signal and detecting moved distance information indicating the relative distance moved between said objective lens and said signal recording surface based on said focus error signal, said relative distance moved caused by a wobbling of the surface of the recording medium when the recording medium rotates,
wherein said objective lens moving means moves the focus position of said objective lens from the current signal recording surface to another signal recording surface by maintaining the current position of said objective lens while maintaining the level of a driving signal for moving said objective lens.

11. An apparatus for writing and/or reading data by emitting laser light on each signal recording surface of a recording medium having a plurality of signal recording surfaces, said apparatus comprising:
pickup means having an objective lens at an output end of said laser light;
objective lens moving means for setting the focused state of the laser light with respect to the signal recording surface of the recording medium by moving said objective lens toward or away from the recording medium;
focus error signal generating means for generating a focus error signal indicating a focusing error between said objective lens and said signal recording surface;
detection means for receiving said focus error signal and detecting moved distance information indicating the relative distance moved between said objective lens and said signal recording surface based on said focus error signal, said relative distance moved caused by wobbling of a surface of the recording medium when the recording medium rotates;
focusing jump control means for controlling said objective lens moving means so that a focusing jump operation is performed for moving the focus position of said objective lens from the current signal recording surface to another signal surface; and
recording medium driving means for rotating the recording medium in a required speed,
wherein said recording medium driving means rotates the recording medium in the required speed depend on the relative distance when said focus jumping control means performs said focusing jump operation.

* * * * *